United States Patent [19]

Kemeny et al.

[11] 4,132,854

[45] Jan. 2, 1979

[54] MULTIPLE CONDUCTOR GAS INSULATED TRANSMISSION LINE

[75] Inventors: George A. Kemeny, Sudbury; Alan H. Cookson, Southborough, both of Mass.

[73] Assignee: Westinghouse Electric Corp., Pittsburgh, Pa.

[21] Appl. No.: 828,470

[22] Filed: Aug. 29, 1977

[51] Int. Cl.² .......................................... H01B 11/00
[52] U.S. Cl. ........................................ 174/27; 174/28; 174/99 B; 174/16 B; 174/26 G; 174/31 R
[58] Field of Search ............... 174/27, 28, 99 B, 16 B, 174/70 R; 138/115, 116

[56] References Cited

U.S. PATENT DOCUMENTS

| | | | |
|---|---|---|---|
| 2,141,912 | 12/1938 | Hobart | 174/27 |
| 2,420,715 | 5/1947 | Millward | 138/116 |
| 2,879,317 | 3/1959 | Wreford | 174/27 |
| 3,170,030 | 2/1965 | Beck et al. | 174/99 B |
| 3,625,258 | 12/1971 | Phelps | 138/115 |
| 3,686,422 | 8/1972 | Doose | 174/27 |
| 3,715,532 | 2/1973 | Morva | 174/28 |

FOREIGN PATENT DOCUMENTS

| | | | |
|---|---|---|---|
| 949670 | 9/1956 | Fed. Rep. of Germany | 174/99 B |
| 1213011 | 3/1960 | France | 174/99 B |
| 2293040 | 6/1976 | France | 174/27 |
| 1043234 | 9/1966 | United Kingdom | 174/27 |

Primary Examiner—J. V. Truhe
Assistant Examiner—John H. Bouchard
Attorney, Agent, or Firm—M. S. Yatsko

[57] ABSTRACT

A gas-insulated transmission line including an elongated outer sheath and a plurality of elongated inner conductors disposed within the outer sheath. An insulating gas electrically insulates the conductors from the sheath, and support means insulatably support the conductors within the sheath. The interior of the outer sheath is separated into a plurality of discrete compartments by walls, with each compartment having disposed therein one of the inner conductors. The compartmentalization of the outer sheath minimizes the possibility of a fault being transferred from one inner conductor to the other conductors.

6 Claims, 5 Drawing Figures

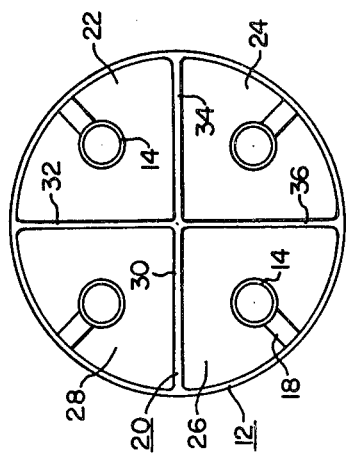
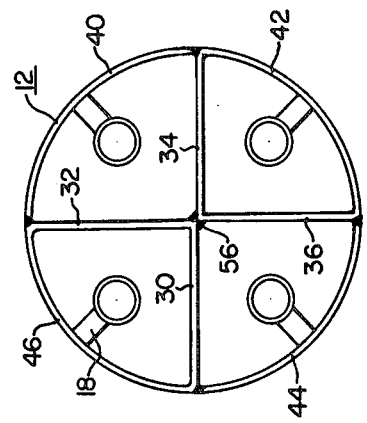
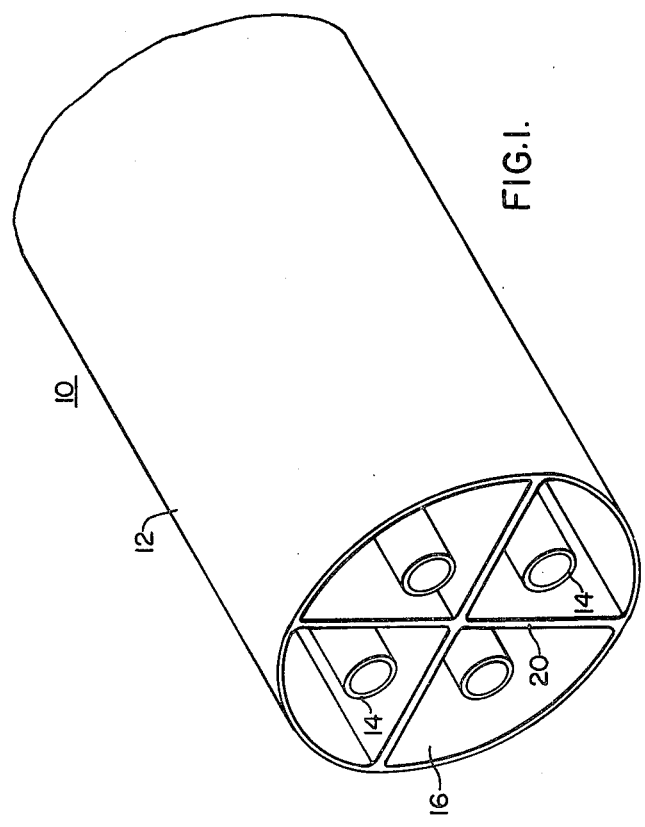
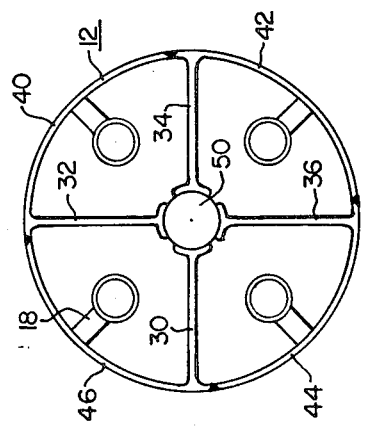
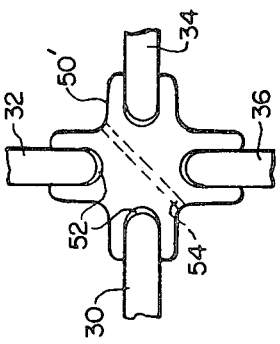

MULTIPLE CONDUCTOR GAS INSULATED TRANSMISSION LINE

BACKGROUND OF THE INVENTION

This invention relates generally to gas insulated equipment and more particularly to a gas insulated transmission line wherein the outer sheath is compartmentalized to minimize the possibility of fault interaction amongst the inner conductors disposed therein.

Gas-insulated transmission lines are being used on an ever-increasing scale in recent years due to the desirability of increasing safety, problems in acquiring right-of-way for overhead lines, and higher power lines required by growing metropolitan areas and the growing demands for electrical energy. Compressed gas insulated transmission lines typically comprise a hollow sheath, a conductor within the sheath, a plurality of solid insulating spacers which support the conductor within the sheath, and a compressed gas such as sulphur hexafluoride to electrically insulate the conductor from the sheath. The typical assembly has been fabricated from relatively short sections of hollow cylindrical ducts or tubes in which the conductor and insulators are inserted. The assembly is usually completed in the factory, and the sections are welded or otherwise secured together in the field to form the transmission line. Gas barriers are provided at intervals along the length of the assembly, and, after evacuation of the line, an insulating gas is forced into the sheath under pressure.

In order for gas insulated transmission lines to be used for long lengths of transmission, it is necessary to reduce both the cost of manufacture and the cost of installation. One such manner of reducing the cost of transmission lines, for multiple phase power transmission, has been to place a plurality of electrical conductors within a single outer sheath. These multiple conductor lines, which typically have all three electrical phases disposed within a single hollow sheath, can reduce the cost of the transmission line by 10 or 15% as compared with isolated phase gas insulated transmission lines. This cost reduction is accomplished by, among others, the lower sheath cost, the necessity for less welding and narrower trenching for underground installation, and the lower power losses associated with the line.

Although such a three conductor system is less expensive than utilizing three independent conductors within three separate sheaths, the use of such plurality of conductors within the outer sheath creates problems which are not present within the single conductor lines. For example, in the multiple conductor systems, any single phase fault to ground or arcing between two of the conductors will very rapidly, if there is a massive fault current, result in a three-phase short circuit before the electrical current is interrupted. This three phase fault is much more severe on electrical equipment such as circuit breakers, transformers, or generators than a single phase to ground fault.

Additionally, in individual phase gas-insulated transmission systems, redundancy for the three phase line can be obtained by providing a fourth gas line which, through suitable switching arrangements, can be energized in the unlikely event that one of the other phases of the gas cable fails. Though any failure may be unlikely, redundancy may be desirable for systems wherein an interruption can be economically disastrous. For an isolated phase system, this extra phase redundancy can be supplied at a cost increase of less than about 33% of the total cost, plus the cost of the switching arrangements. For the multiple conductor system, where any massive failure will incapacitate the entire cable, redundancy can be supplied only by adding a second multiple phase cable and hence by a cost increase of approximately 100%, plus the cost of the switching arrangement.

SUMMARY OF THE INVENTION

In accordance with this invention, it has been found that a more desirable multiple conductor high-voltage gas insulated transmission line is provided which comprises an elongated outer sheath, a plurality of elongated inner conductors disposed within the outer sheath, an insulating gas electrically insulating the inner conductors, and support means for insulatably supporting the inner conductors within the outer sheath. Also, included are means disposed within the outer sheath and extending longitudinally therealong, for isolating each of the inner conductors from the remaining other conductors so as to prevent the propagation of a fault amongst the multiple conductors.

BRIEF DESCRIPTION OF THE DRAWINGS

Reference is now made to the description of the preferred embodiment, illustrated in the accompanying drawings, in which:

FIG. 1 is an isometric view of a multiple conductor gas-insulated transmission line utilizing the teachings of this invention;

FIG. 2 is an end view looking into the transmission line of FIG. 1;

FIG. 3 is a modification of the view of FIG. 2;

FIG. 4 is a detailed view of a modification of the joining member illustrated in FIG. 3; and FIG. 5 is a modification of the view of FIG. 2.

DESCRIPTION OF THE PREFERRED EMBODIMENT

Referring now more particularly to FIGS. 1 and 2, therein is illustrated a gas insulated transmission line 10 utilizing the teachings of this invention. The transmission line 10, which may carry high-voltages on the order of, say, 345–1200 KV, is comprised of an elongated, hollow outer sheath 12, typically cylindrical, with a plurality of elongated inner conductors 14 disposed therein. Disposed within the outer sheath 12, and electrically insulating the inner conductors 14 from the outer sheath 12, is an insulating gas 16, typical of which is sulphur hexafluoride at elevated pressures such as 45 pounds per square inch. Insulatably supporting the inner conductors 14 within the outer sheath 12 are insulating supports 18. Although illustrated as having disposed therein four inner conductors 14, this invention is not so limited, and may be practiced utilizing two or more inner conductors 14. Also, although the preferred shape of the outer sheath 12 is cylindrical, the transmission line 10 may instead be of other shapes, for example, triangular. And although the transmission line 10 illustrated is for a multi-phase alternating current power transmission system, it may also be utilized for direct current applications.

Disposed within the outer sheath 12, and extending longitudinally along the outer sheath 12, are compartment-forming means 20. These compartment-forming means 20 function to separate the outer sheath 12 into a plurality of longitudinally extending discrete compartments 22, 24, 26, and 28 which function to isolate each inner conductor 14 from every other inner conductor 14 which is disposed within the outer sheath 12. The compartment-forming means 20 typically would be of a metal, and could be of aluminum as is the outer sheath 12 and inner conductors 14. The compartment-forming means 20 are made from a plurality of walls 30, 32, 34, 36 which extend inwardly from the outer sheath 12 and meet along the longitudinal axis of the outer sheath 12. The walls 30, 32, 34, 36 are disposed between adjacent inner conductors 14, so that, upon the forming of the compartments 22, 24, 26, 28, no single compartment 22, 24, 26, 28 has disposed therein more than one inner conductor 14. Although each conductor 14 is illustrated as a single member, the conductor 14 may itself be comprised of a plurality of individual conductors suitably joined or held together and electrically at the same voltage.

The transmission line 10 shown in FIG. 2 has been divided into four separate and discrete compartments 22, 24, 26, 28, and each compartment has disposed therein one inner conductor 14. This configuration may be utilized for the transmission of three phase, alternating current power, with the fourth inner conductor 14 being utilized to provide a redundancy of the phases so that, in the unlikely event of a fault within one of the phases, the extra conductor can be utilized to maintain the transmission of multiple phase power. If such redundancy is not required, the transmission line 10 may, for example, contain only three discrete compartments with one inner conductor 14 disposed within each compartment. By isolating each inner conductor 14 from the other inner conductors 14 disposed within the outer sheath 12, the probability of a phase-to-phase fault occurring is greatly minimized; the walls 30, 32, 34, 36, function to prevent any arc which may occur from being transmitted to the adjacent inner conductors 14, and instead transfer the arc to the grounded outer sheath 12.

If the size of the outer sheath 12 is small enough, the outer sheath 12 and the walls 30, 32, 34, 36, can be extruded from a single piece of aluminum so that the compartment-forming means 20 and the outer sheath 12 are integrally formed. However, for higher levels of electrical power transmission, voltages and currents are increased, the size of the inner conductors 14 and the outer sheath 12 housing them becomes larger, and the sheath therefore becomes too large to be extruded in a single piece. Instead, it is then possible to form the outer sheath 12 and walls 30, 32, 34, 36, in a plurality of sections which may then be secured together to form the transmission line. FIGS. 3 and 5 illustrate modifications of the transmission line 10 which are so formed.

In FIG. 3, the outer sheath 12 is formed from a plurality of individual outer sheath sectors 40, 42, 44, 46, and also formed with each sheath sector is one of the walls 30, 32, 34, 36. The outer sheath 12 and the compartmentalization means 20 are then formed by welding together the individual sheath sectors 40, 42, 44, 46, with the walls 30, 32, 34, 36 extending inwardly and contacting a joining member 50 which is disposed along the outer sheath longitudinal axis. The joining member 50 illustrated in FIG. 3 is of a compressible material which seals against the walls 30, 32, 34, 36 and, in the unlikely event of arcing in one phase, prevents contamination from one compartment 22, 24, 26, 28 passing to another. One material which may be utilized as the compressible material 50 is that sought under the trademark TEFLON which has been foamed, an alternative would be to use a polypropylene filter material.

A modification of the joining member 50 is illustrated in FIG. 4, wherein it is shown that the joining member 50' is a solid material which is suitably molded so as to provide a plurality of slots 52 in which are disposed the walls 30, 32, 34, 36. This modified joining member 50' also prevents contamination from passing between compartments, and may be provided with openings 54 therethrough which pass from one compartment, for example, 22 to another compartment for example, 26, to provide gas pressure equilization between the compartments. These openings 54 may be disposed at various locations along the joining member 50' so as to provide interconnection along all compartments. The openings 54 should be of a size so as to prevent the flow of contamination material through them from the various compartments.

FIG. 5 shows a modification of the transmission line 10 illustrated in FIG. 3. In this modification, the sheath sectors 42 and 46 each have formed with them two walls 34, 36, and 30, 32, respectively. The walls 30, 32, 34, 36, are then joined where they meet at the longitudinal axis of the outer sheath 12 by means such as the weld 56, and then the two sheath sectors 40 and 44, which comprise a part of the circumference of the outer sheath 12, are welded to the sheath sectors 42, 46, so as to form the cylindrical outer sheath 12. Suitable external piping (not shown) may be utilized to provide gas pressure equalization amongst the various compartments, as also may be utilized in FIG. 2.

Thus, it can be seen that the gas-insulated transmission line of this invention minimizes the probability of a phase-to-phase fault occurring in multiple conductor systems, and increases the reliability of the system by including an economical way of providing redundancy for at least one of the phases.

We claim as our invention:

1. A multiple conductor, high-voltage gas-insulated transmission line comprising:

an elongated, cylindrical outer sheath at low electrical potential;

a plurality of elongated inner conductors at high electrical potential with respect to said outer sheath disposed within said outer sheath;

a pressurized insulating gas electrically insulating said inner conductors from said outer sheath;

means for insulatably supporting said inner conductors within said outer sheath; and, means disposed within, and extending longitudinally along said outer sheath for electrically isolating each of said inner conductors from each other inner conductor, said isolation means comprising a single-piece metallic wall, at the same electrical potential as said outer sheath, extending between each pair of adjacent inner conductors, said outer sheath comprising a plurality of sheath sectors secured together, said metallic walls being extruded with said sheath sectors, said outer sheath being circular in cross-section about a longitudinal axis, a joining member of a compressible material being disposed along said outer sheath longitudinal axis, and said metallic walls extending from said sheath sectors to said joining member.

2. The transmission line according to claim 1 wherein said outer sheath and said walls are extruded.

3. A multiple conductor high-voltage gas-insulated transmission line comprising:

a hollow elongated cylindrical outer sheath at low electrical potential;

a plurality of elongated inner conductors at high electrical potential with respect to said outer sheath disposed within said outer sheath;

a pressurized insulating gas electrically insulating said inner conductors from said outer sheath;

means for insulatably supporting said inner conductors within said outer sheath;

means disposed within said outer sheath for forming a plurality of longitudinally extending discrete compartments, each of said compartments having disposed therein no more than one of said inner conductors, said compartment-forming means comprising a plurality of longitudinally extending single-piece metallic walls at the same electrical potential as said outer sheath, each of said compartments being separated from each other compartment adjacent to it by only one of said single-piece metallic walls; and, means for equalizing the gas pressure between said compartments.

4. A multiple conductor high-voltage gas-insulated transmission line comprising:

a hollow elongated cylindrical outer sheath at low electrical potential circular in cross-section about a longitudinal axis;

a plurality of elongated inner conductors at high electrical potential with respect to said outer sheath disposed within said outer sheath;

a pressurized insulating gas electrically insulating said inner conductors from said outer sheath;

means for insulatably supporting said inner conductors within said outer sheath; and, means disposed within said outer sheath for forming a plurality of longitudinally extending discrete compartments, each of said compartments having disposed therein no more than one of said inner conductors, said compartment-forming means comprising a plurality of longitudinally extending single-piece metallic walls at the same electrical potential as said outer sheath, a joining member of a compressible material disposed along said outer sheath longitudinal axis and said plurality of metallic walls being secured to said outer sheath and extending to, and contacting said joining member, each of said compartments being separated from each other compartment adjacent to it by only one of said metallic walls.

5. The transmission line according to claim 4 wherein said joining member includes means for equalizing the gas pressure between said compartments.

6. The transmission line according to claim 3 wherein said compartment-forming means forms four discrete compartments each having disposed therein one of said inner conductors.

* * * * *